(12) United States Patent
Li et al.

(10) Patent No.: US 10,712,237 B2
(45) Date of Patent: Jul. 14, 2020

(54) FAULT DIAGNOSIS AND LIFE TESTING MACHINE FOR FLEXIBLE PRECISION THIN-WALL BEARING

(71) Applicant: SOUTH CHINA UNIVERSITY OF TECHNOLOGY, Guangdong (CN)

(72) Inventors: Weiguang Li, Guangdong (CN); Zhen Li, Guangdong (CN); Xuezhi Zhao, Guangdong (CN); Guo Zhao, Guangdong (CN); Yiqin Zhuang, Guangdong (CN); Dongze Zheng, Guangdong (CN); Xin Lin, Guangdong (CN); Junkuan Cui, Guangdong (CN); Hui Chen, Guangdong (CN); Jingrun Zhang, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 16/319,813

(22) PCT Filed: Dec. 11, 2017

(86) PCT No.: PCT/CN2017/115463
§ 371 (c)(1),
(2) Date: Jan. 22, 2019

(87) PCT Pub. No.: WO2018/121232
PCT Pub. Date: Jul. 5, 2018

(65) Prior Publication Data
US 2019/0250067 A1      Aug. 15, 2019

(30) Foreign Application Priority Data

Dec. 27, 2016   (CN) .......................... 2016 1 1222339

(51) Int. Cl.
*G01M 13/045*      (2019.01)
(52) U.S. Cl.
CPC ................. *G01M 13/045* (2013.01)
(58) Field of Classification Search
CPC ................................................. G01M 13/045
(Continued)

(56) References Cited

U.S. PATENT DOCUMENTS

| 2,780,091 A | * | 2/1957 | Amen ...................... G01N 3/56 |
| | | | 73/9 |
| 5,133,211 A | * | 7/1992 | Brown .................. G01M 13/04 |
| | | | 73/115.07 |

(Continued)

FOREIGN PATENT DOCUMENTS

| CN | 20648949 | 1/2013 |
| CN | 104236909 | 12/2014 |

(Continued)

OTHER PUBLICATIONS

"International Search Report (Form PCT/ISA/210)", dated Feb. 24, 2018, with English translation thereof, pp. 1-4.

*Primary Examiner* — Natalie Huls
*Assistant Examiner* — Monica S Young
(74) *Attorney, Agent, or Firm* — JCIPRNET

(57) ABSTRACT

The present invention discloses a fault diagnosis and life testing machine for a flexible precision thin-wall bearing (16), including a rack, and an axial loading device, a main driving device, a bearing mounting device, a clamping tooling, a data acquisition device, a hydraulic and a pneumatic auxiliary device which are provided on the rack. The main driving device is connected to a rear side of the axial loading device, and the clamping tooling is arranged at a front side of the axial loading device, for clamping the thin-wall bearing (16) onto the bearing mounting device. The data acquisition device is arranged in the axial loading device and at a side of the rack, the hydraulic and pneumatic auxiliary device is arranged at a side of the rack, and the axial loading device and the main driving device are connected by a pipeline. This testing machine can apply dynamic and static loads to the precision flexible thin-wall bearing (16), can realize measurement of a bearing vibration, a bearing temperature, a bearing rotation progress and a rotation speed, and has advantages such as clever structure, (Continued)

perfect test function and relatively high test accuracy, safe and reliable detection process, and highly feedback results.

7 Claims, 6 Drawing Sheets

(58) Field of Classification Search
USPC .......................................................... 73/593
See application file for complete search history.

(56) References Cited

U.S. PATENT DOCUMENTS

| | | | | |
|---|---|---|---|---|
| 5,889,218 | A * | 3/1999 | Sato | G01M 13/04 |
| | | | | 73/593 |
| 2005/0006002 | A1* | 1/2005 | Barclay deTolly | B25H 1/06 |
| | | | | 144/286.5 |
| 2014/0363112 | A1* | 12/2014 | Sugita | C22C 38/02 |
| | | | | 384/462 |
| 2016/0091403 | A1 | 3/2016 | Jung | |
| 2016/0139000 | A1* | 5/2016 | Karasawa | A61B 6/035 |
| | | | | 73/865.9 |

FOREIGN PATENT DOCUMENTS

| | | |
|---|---|---|
| CN | 205483561 | 8/2016 |
| CN | 106198019 | 12/2016 |
| CN | 106596107 | 4/2017 |
| CN | 206420654 | 8/2017 |
| KR | 20160138673 | 12/2016 |

* cited by examiner ered and wide application of the industrial robots in China. However, there are very few reports on the flexible thin-wall bearing, a life testing machine thereof and a flexible thin wall fault diagnosis method at home and abroad.

FAULT DIAGNOSIS AND LIFE TESTING MACHINE FOR FLEXIBLE PRECISION THIN-WALL BEARING

CROSS-REFERENCE TO RELATED APPLICATION

This application is a 371 of international application of PCT application serial no. PCT/CN2017/115463, filed on Dec. 11, 2017, which claims the priority benefit of China application no. 201611222339.1, filed on Dec. 27, 2016. The entirety of each of the above-mentioned patent applications is hereby incorporated by reference herein and made a part of this specification.

TECHNICAL FIELD

The present invention relates to a fault diagnosis and life testing machine for a flexible precision thin-wall bearing, especially suitable for fault diagnosis for a precision flexible thin-wall bearing used for a harmonic reducer, and in particular, to a life testing machine based on sensor technology, belonging to the field of mechanical fault diagnosis.

BACKGROUND

Harmonic reducer makes a flexible wheel generate controllable elastic deformation by a wave generator, and uses a controllable elastic deformation of a flexible bearing to transmit motion and power. As a reducer with high reduction ratio, small mass, light weight and high transmission precision, the harmonic reducer is recognized as the "best" transmission gear for robots, and is widely applied to various fields of transmission systems, such as spacecraft, spaceship, robot, radar equipment and medical equipment.

At present, China is vigorously developing high-end intelligent equipment industry represented by robots. Since 2013, China has become the largest market for industrial robots in the world for three consecutive years. China is gradually entering the stage of development of industrialization for the industrial robots. In the process of industrialization for the industrial robots, however, there are many puzzles that hinder the development. Among them, the status quo that core components represented by precision reducers cannot be self-sufficient is particularly prominent.

Precision flexible thin-wall bearing is a core component of the harmonic reducer and plays a vital role in an overall performance of the harmonic reducer. Under working condition, the precision flexible thin-wall bearing is not only subjected to elastic deformation under extrude-bulge of an inner ring of the thin-wall bearing precisely matching with an elliptical axis, but also subjected to an alternating stress generated by its own operation, and in the case of unsatisfactory working conditions, the precision flexible thin-wall bearing is also subjected to different static or dynamic loads from the outside world. Therefore, in the research and development process of the flexible thin-wall bearing used for the harmonic reducer, stability, rotation precision and life of the precision flexible thin-wall bearing should be tested. Only after all the performances meet requirements can the industrial production be put into operation, thereby solving a bottleneck problem of the core component of the industrial robots in China, providing support for the industrialization and wide application of the industrial robots in China. However, there are very few reports on the flexible thin-wall bearing, a life testing machine thereof and a flexible thin wall fault diagnosis method at home and abroad.

As a key component of the harmonic reducer, the rotation precision and stability of the precision flexible thin-wall bearing under different working conditions plays a very important role in the overall performance of the harmonic reducer. A geometric cross-sectional shape of the precision flexible thin-wall bearing is circular, and becomes elliptical when loaded in the harmonic reducer. Thus, the development of the fault diagnosis and life testing machine for the precision flexible thin-wall bearing used for the harmonic reducer should simulate the life testing of the flexible thin-wall bearing under actual working conditions as much as possible.

SUMMARY OF THE INVENTION

An object of the present invention is to provide a fault diagnosis and life testing machine of simulating both dynamic and static loading ways under an actual working condition of a flexible thin-wall bearing in a harmonic reducer, to accomplish test and analysis to a vibration signal of the flexible thin-wall bearing, and thereby to provide a test scheme of fault diagnosis for a precision flexible thin-wall bearing.

The object of the present invention is achieved by the following solution:

a fault diagnosis and life testing machine for a flexible precision thin-wall bearing, includes a rack, and an axial loading device, a main driving device, a bearing mounting device, a clamping tooling, a data acquisition device and a hydraulic and pneumatic auxiliary device which are provided on the rack, the main driving device is connected to a rear side of the axial loading device, the clamping tooling is arranged at a front side of the axial loading device, for clamping the thin-wall bearing onto the bearing mounting device; the data acquisition device is arranged in the axial loading device and at a side of the rack, the hydraulic and pneumatic auxiliary device is arranged at a side of the rack, and is connected to the axial loading device and the main driving device by a pipeline.

Further, the main driving device includes an electric spindle mounting base and an electric spindle, the electric spindle mounting base is locked onto the rack by a T-shaped bolt, the electric spindle is fixed onto the electric spindle mounting base by a bolt.

Further, the clamping tooling includes a fixture base, a fixture handle, a fixed jaw, a mobile jaw, a fixed clamping piece, a mobile clamping piece, a fixture pallet and a guide rod, the fixture base are locked onto a T-shaped groove provided at a platform base by a T-shaped bolt, the fixture handle, the mobile jaw and the fixed jaw are arranged on the fixture base, the mobile jaw is connected to a sliding piece on a screw connected to the fixture handle, the fixed clamping piece and the mobile clamping piece are arranged between the fixed jaw and the mobile jaw, the fixed clamping piece and the fixed jaw are fastened together by a bolt, the mobile clamping piece and the mobile jaw are fastened together by a bolt, the fixture pallet is located under the fixed clamping piece and the mobile clamping piece, the fixture pallet is divided into two pieces, one piece is fastened with the fixed clamping piece by a screw, while the other piece is fastened with the mobile clamping piece by a screw, the guide rod is arranged between the fixed clamping piece and the mobile clamping piece, for guiding the fixed clamping piece and the mobile clamping piece to be closed together.

Further, the bearing mounting device includes a bearing mounting body, a blind rivet, a thin-wall bearing, a boss clamping plate, a clamp bolt, a release preventing ring and two symmetrical semicircular clamping plates, the blind rivet is screwed to a tail portion of the bearing mounting body by a screw thread, a conical surface on the bearing mounting body and a conical surface on the electric spindle in the main driving device match with each other and are locked by the blind rivet, the conical surface having a taper ratio of 7:24; the thin-wall bearing is arranged on an elliptical journal of the bearing mounting body, a difference between a long axis and a short axis of the elliptical journal is 1-1.3 times a tooth height of a flexible wheel; and the boss clamping plate is arranged at an outer side of the thin-wall bearing, and the semicircular clamping plate is arranged at an inner side of the thin-wall bearing, the boss clamping plate and the semicircular clamping plate clamp the thin-wall bearing arranged therebetween by the clamp bolt, the release preventing ring is arranged on the clamp bolt, the clamp bolt is provided with a via for mounting the release preventing ring.

Further, the axial loading device includes a loading driving device, a loading driving elliptical shaft, a loading bearing, a loading shaft, a loading connecting rod, a loading screw, a loading support, a loading spring, a pressure sensing mounting base, a pressurizing piece, a lubricating outlet nozzle tip, a loading pedestal, an eddy current mounting rack, a lubricating inlet nozzle tip, a loading motor mounting base, a loading shaft mounting piece, a loading piece mounting base, a lower oil groove sealing plate and an upper oil groove sealing plate, the loading pedestal is fixed onto the platform base by a T-shaped bolt, left and right halves of the loading shaft mounting piece are symmetrically located above the loading pedestal, the loading motor mounting base is located above the loading shaft mounting piece, passes through the loading shaft mounting piece and is locked and fixed onto the loading pedestal by a bolt, the upper oil groove sealing plate is arranged at front and rear sides of the loading shaft mounting piece and is fastened by a screw, the loading driving device is located above the loading motor mounting base, the loading driving elliptical shaft is fixed between the loading pedestal and the loading motor mounting base by rolling bearings provided at both ends of the loading driving elliptical shaft, the loading bearing is fixed at an end of the loading shaft, the loading shaft is located on the loading shaft mounting piece, the loading connecting rod is connected with the loading shaft by a U-shaped opening provided on the loading connecting rod, an end of the loading support is fixed on the loading pedestal, the other end of the loading support is connected with the loading connecting rod by a pin, the loading screw is located at an end of the loading connecting rod, the loading spring is located between the pressure sensing mounting base and the loading screw, the pressure sensing mounting base is located at an end of the loading spring, the pressurizing piece is located on the loading pedestal and is located inside a guide groove of the loading piece mounting base, the lower oil groove sealing plate is fixed at front and rear sides of the loading pedestal, the loading piece mounting base is fixed inside the loading pedestal by a bolt, the lubricating inlet nozzle tip is located above the loading motor mounting base, the lubricating outlet nozzle tip is located at a middle position under the loading pedestal, the eddy current mounting rack is fixed onto the upper oil groove sealing plate, for mounting an eddy current sensor, a temperature sensor and a rotation speed sensor.

Further, the data acquisition device includes a pressure sensor, an acceleration sensor, the eddy current sensor, the temperature sensor, the rotation speed sensor and a data collector, the pressure sensor, the acceleration sensor, the temperature sensor, the eddy current sensor and the rotation speed sensor are mounted onto the axial loading device respectively, the temperature sensor is located near the electric spindle and the pressurizing piece respectively, the data collector is located at a side of the rack to collect data from each sensor.

Further, the hydraulic and pneumatic auxiliary device includes a main driving motor, a heat dissipation electromagnetic reversing valve, a lubricating electromagnetic reversing valve, a lubricating pressure reducing valve, a cooling and pressure reducing valve, an oil pipe, a heat dissipation motor, a heat dissipation fan, an air pump, a water-gas filter, a gas path electromagnetic reversing valve, a gas delivery pipe, an oil return electromagnetic valve, a filter, a check valve, a relief valve and an oil tank, the main driving motor, the heat dissipation electromagnetic reversing valve, the lubricating electromagnetic reversing valve, the heat dissipation motor, the heat dissipation fan, the gas path electromagnetic reversing valve, the oil return electromagnetic valve and the relief valve are located above the oil tank, an oil outlet of the main driving motor is connected with an oil inlet P of the heat dissipation electromagnetic reversing valve and an oil inlet P of the lubricating electromagnetic reversing valve respectively, the heat dissipation electromagnetic reversing valve and the lubricating electromagnetic reversing valve are connected to the cooling and pressure reducing valve and the lubricating pressure reducing valve respectively, a cooling joint of the electric spindle is connected with an outlet of the cooling and pressure reducing valve by the oil pipe, the lubricating inlet nozzle tip is connected with the lubricating pressure reducing valve by the oil pipe, a relief valve is provided between the main driving motor and the oil inlets P of the heat dissipation electromagnetic reversing valve and the lubricating electromagnetic reversing valve, the heat dissipation fan is connected with the heat dissipation motor, a gas delivery port of the air pump is connected with an gas inlet of the water-gas filter, a gas outlet of the water-gas filter is divided into two paths, one path is connected with the gas path electromagnetic reversing valve, while the other path is connected with the oil return electromagnetic valve, the gas path electromagnetic reversing valve is connected with a clamping and loosening joint on the electric spindle by the gas delivery pipe, the oil return electromagnetic valve is connected with an oil return port B of the lubricating electromagnetic reversing valve, the lubricating outlet nozzle tip in the axial loading device is connected with an oil inlet end of the check valve by the oil pipe, an oil outlet of the check valve is connected with an oil inlet end of the filter, an oil outlet of the filter is connected with a gas outlet A of the oil return electromagnetic valve.

Further, an elliptical portion is provided on the loading driving elliptical shaft in the axial loading device, a long axis of the elliptical portion is 10-30 mm longer than a short axis; an annular oil groove is provided at an edge of a baseplate of the loading pedestal in the axial loading device, the annular oil groove is communicated with the lubricating outlet nozzle tip; and an arc-shaped groove of the pressurizing piece in the axial loading device is a circular structure.

Further, an inner bore formed when the fixed clamping piece and the mobile clamping piece in the clamping tooling are closed together is an elliptical structure, a circular positioning boss is provided above the fixture pallet, a diameter of the circular positioning boss is 1-2 mm larger than an inner diameter of the thin-wall bearing.

Further, the rack includes a leg frame, a support frame, a panel, a platform base and a damping block, the leg frame is located at a bottom of four support legs of the support frame, for adjusting a level of the panel, the panel is fixed onto the support frame by a bolt, the damping block is located between the panel and the platform base, the platform base is fastened and connected to the panel by a lengthened bolt, the lengthened bolt has a damping rubber.

Compared with the prior art, the present invention realizes fault and life tests for a precision flexible thin-wall bearing used for a harmonic reducer with under a relatively realistic working condition. It can apply dynamic and static loads to the precision flexible thin-wall bearing, can realize measurement of a bearing vibration, a bearing temperature, a bearing rotation progress and a rotation speed, and has advantages such as clever structure, perfect test function and relatively high test accuracy, safe and reliable detection process, and highly feedback results.

TO THE BRIEF DESCRIPTION OF THE DRAWINGS

DETAILED DESCRIPTION OF THE PREFERRED EMBODIMENT

Figure 1:
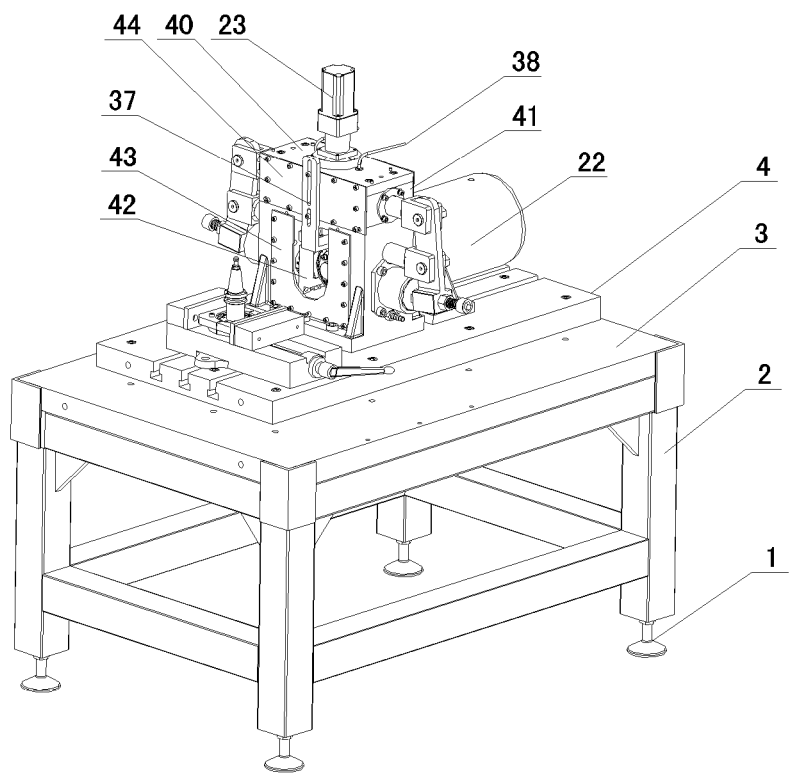
FIG. 1 is a schematic view of an axial side structure of an overall structure according to an embodiment of the present invention.
Figure 2:
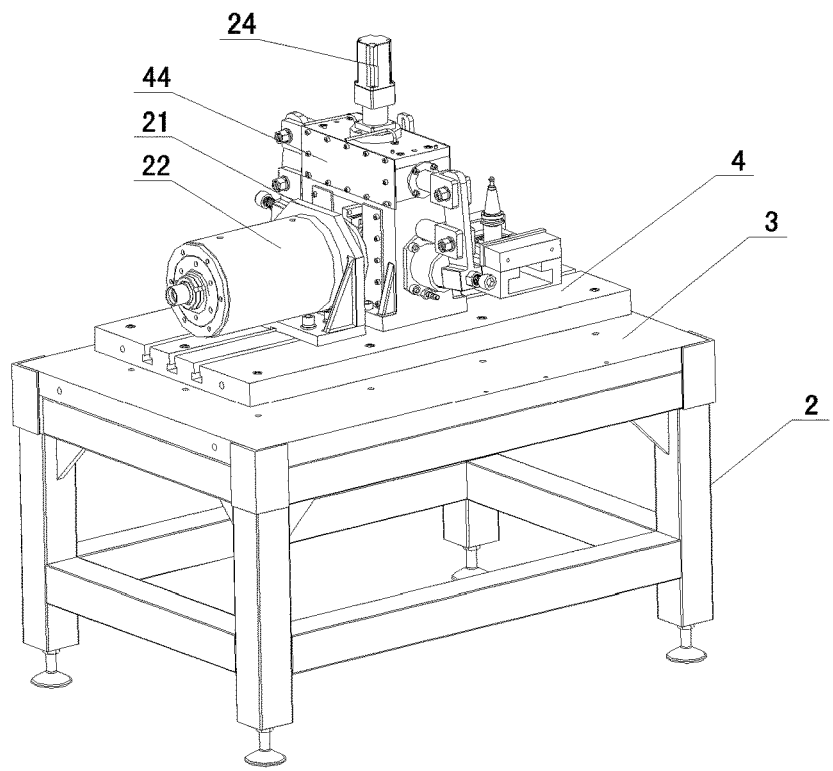
FIG. 2 is a schematic view of the axial side structure of another perspective of the overall structure according to the embodiment of the present invention.
Figure 3:
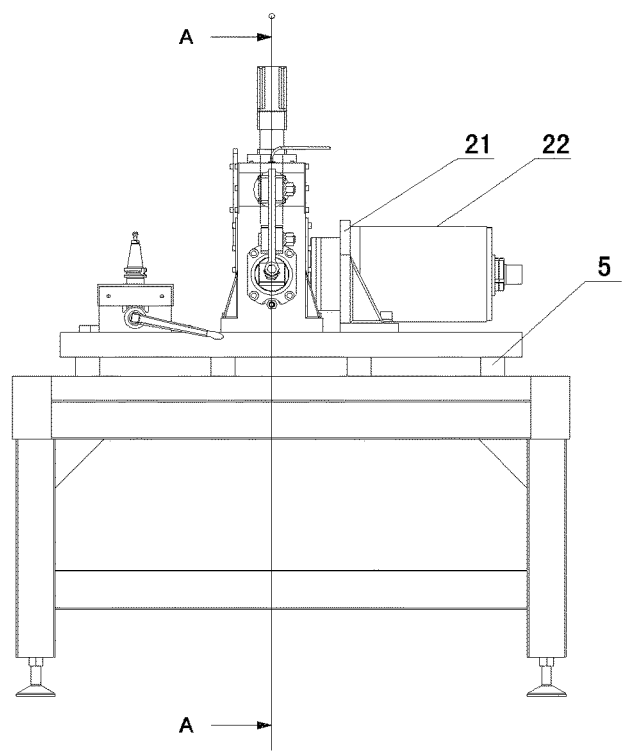
FIG. 3 is a schematic front view of the overall structure according to the embodiment of the present invention.
Figure 4:
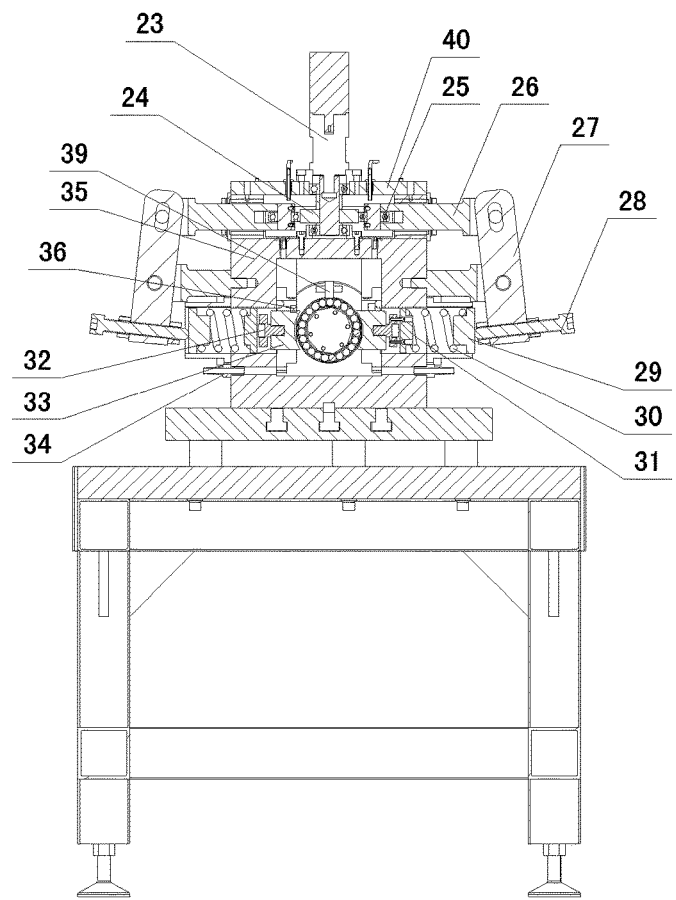
FIG. 4 is a schematic cross-sectional view of the A-A direction in FIG. 3.
Figure 5:
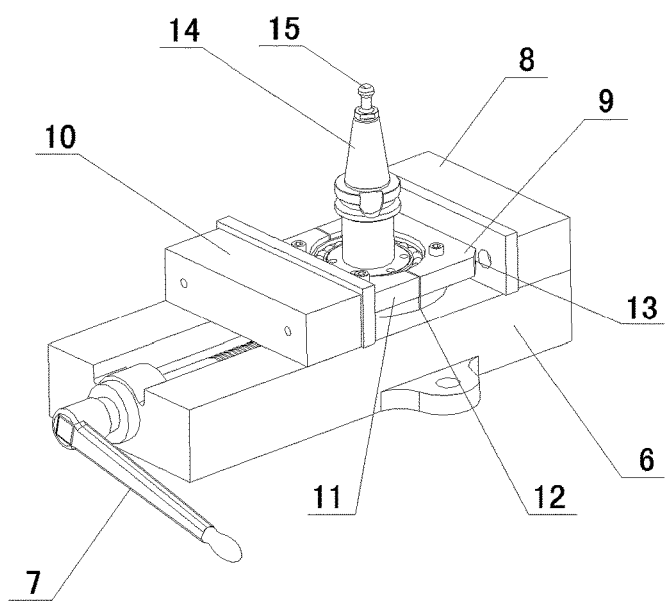
FIG. 5 is a schematic view of an axial side structure of a clamping tooling according to the embodiment of the present invention.
Figure 6:
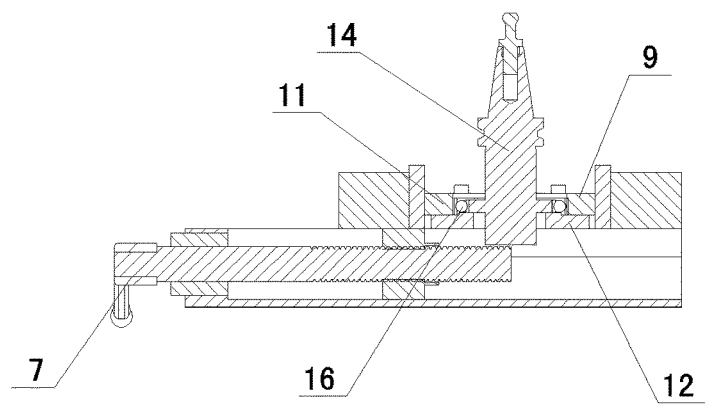
FIG. 6 is a schematic cross-sectional view of the clamping tooling according to the embodiment of the present invention.
Figure 7:
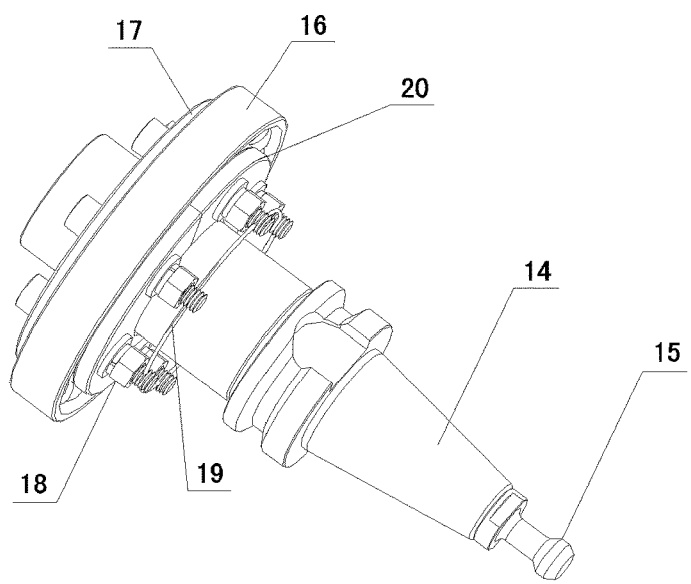
FIG. 7 is a schematic view of an axial side structure of a bearing mounting device according to the present invention.
Figure 8:
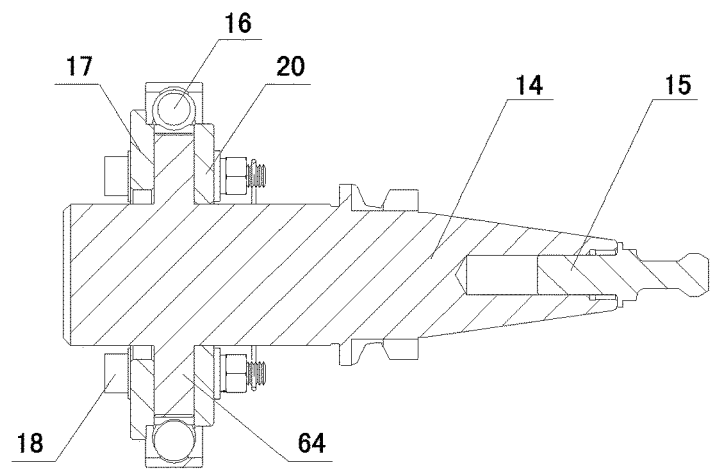
FIG. 8 is a schematic cross-sectional view of the bearing mounting device according to the present invention.
Figure 9:
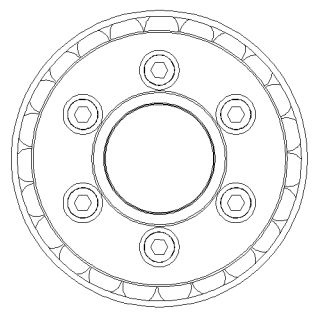
FIG. 9 is a schematic left side view of the bearing mounting device according to the embodiment of the present invention.

The object of the present invention is further described in detail below by the following specific embodiments, and the embodiments cannot be described in detail herein, but the implementations of the present invention are not limited to the following embodiments:

As shown in FIG. 1 to FIG. 11, a fault diagnosis and life testing machine for a flexible precision thin-wall bearing, includes a rack, and an axial loading device, a main driving device, a bearing mounting device, a clamping tooling, a data acquisition device, a hydraulic and pneumatic auxiliary device which are provided on the rack. The main driving device is connected to a rear side of the axial loading device. The clamping tooling is arranged at a front side of the axial loading device, for clamping the thin-wall bearing 16 onto the bearing mounting device. The data acquisition device is arranged in the axial loading device and at a side of the rack. The hydraulic and pneumatic auxiliary device is arranged at a side of the rack. The axial loading device and the main driving device are connected by a pipeline.

Specifically, the main driving device includes an electric spindle mounting base 21 and an electric spindle 22. The electric spindle mounting base 21 is locked onto a T-shaped groove provided at a platform base 4 by a T-shaped bolt. The electric spindle 22 is fixed onto the electric spindle mounting base 21 by a bolt.

Specifically, the clamping tooling includes a fixture base 6, a fixture handle 7, a fixed jaw 8, a mobile jaw 10, a fixed clamping piece 9, a mobile clamping piece 11, a fixture pallet 12 and a guide rod 13. The fixture base 6 is locked onto the T-shaped groove provided at the platform base 4 by a T-shaped bolt. The fixture handle 7, the mobile jaw 10 and the fixed jaw 8 are arranged on the fixture base 6. The mobile jaw 10 is connected to a sliding piece on a screw connected to the fixture handle 7. The fixed clamping piece 9 and the mobile clamping piece 11 are arranged between the fixed jaw 8 and the mobile jaw 10. The fixed clamping piece 9 and the fixed jaw 8 are fastened together by a bolt. The mobile clamping piece 11 and the mobile jaw 10 are fastened together by a bolt. The fixture pallet 12 is arranged under the fixed clamping piece 9 and the mobile clamping piece 11. The fixture pallet 12 is divided into two pieces, with one piece being fastened with the fixed clamping piece 9 by a screw, while the other piece being fastened with the mobile clamping piece 11 by a screw. The guide rod 13 is arranged between the fixed clamping piece 9 and the mobile clamping piece 11, for guiding the fixed clamping piece 9 and the mobile clamping piece 11 to be closed together.

Specifically, the bearing mounting device includes a bearing mounting body 14, a blind rivet 15, a thin-wall bearing 16, a boss clamping plate 17, a clamp bolt 18, a release preventing ring 19 and two symmetrical semicircular clamping plates 20, the blind rivet 15 is screwed to a tail portion of the bearing mounting body 14 by a screw thread, a conical surface on the bearing mounting body 14 and a conical surface on the electric spindle 22 in the main driving device match with each other and are locked by a blind rivet 15, and the conical surface has a taper ratio of 7:24. The thin-wall bearing 16 is arranged on an elliptical journal 64 of the bearing mounting body 14, and a difference between a long axis and a short axis of the elliptical journal 64 is 1-1.3 times a tooth height of a flexible wheel. The boss clamping plate 17 is arranged at an outer side of the thin-wall bearing 16. The semicircular clamping plate 20 is arranged at an inner side of the thin-wall bearing 16. The boss clamping plate 17 and the semicircular clamping plate 20 clamp the thin-wall bearing 16 arranged therebetween by the clamp bolt 18. The release preventing ring 19 is arranged on the clamp bolt 18. The clamp bolt 18 is provided with a via for mounting the release preventing ring 19.

Specifically, the axial loading device includes a loading driving device 23, a loading driving elliptical shaft 24, a loading bearing 25, a loading shaft 26, a loading connecting rod 27, a loading screw 28, a loading support 29, a loading spring 30, a pressure sensing mounting base 31, a pressurizing piece 33, a lubricating outlet nozzle tip 34, a loading pedestal 35, an eddy current mounting rack 37, a lubricating inlet nozzle tip 38, a loading motor mounting base 40, a loading shaft mounting piece 41, a loading piece mounting base 42, a lower oil groove sealing plate 43 and an upper oil groove sealing plate 44. The loading pedestal 35 is fixed onto the platform base 4 by a T-shaped bolt. Left and right halves of the loading shaft mounting piece 41 are symmetrically located above the loading pedestal 35. The loading motor mounting base 40 is located above the loading shaft mounting piece 41, passes through the loading shaft mounting piece 41 and is locked and fixed onto the loading pedestal 35 by a bolt. The upper oil groove sealing plate 44 is arranged at front and rear sides of the loading shaft mounting piece 41 and is fastened by a screw. The loading driving device 23 is located above the loading motor mounting base 40. The loading driving elliptical shaft 24 is fixed between the loading pedestal 35 and the loading motor mounting base 40 by rolling bearings provided at both ends of the loading driving elliptical shaft 24. The loading bearing 25 is fixed at an end of the loading shaft 26, and the loading shaft 26 is located on the loading shaft mounting piece 41. The loading connecting rod 27 is connected with the loading shaft 26 by a U-shaped opening provided on the loading connecting rod 27. An end of the loading support 29 is fixed on the loading pedestal 35, and an other end of the loading support 29 is connected with the loading connecting rod 27 by a pin. The loading screw 28 is located at an end of the loading connecting rod 27. The loading spring 30 is located between the pressure sensing mounting base 31 and the loading screw 28. The pressure sensing mounting base 31 is located at an end of the loading spring 30. The pressurizing piece 33 is located on the loading pedestal 35 and is located inside a guide groove of the loading piece mounting base 42. The lower oil groove sealing plate 43 is fixed at front and rear sides of the loading pedestal 35. The loading piece mounting base 42 is being fixed inside the loading pedestal 35 by a bolt. The lubricating inlet nozzle tip 38 is located above the loading motor mounting base 40. The lubricating outlet nozzle tip 34 is located at a middle position under the loading pedestal 35. The eddy current mounting rack 37 is fixed onto the upper oil groove sealing plate 44, for mounting an eddy current sensor 39, a temperature sensor 61 and a rotation speed sensor 62.

Specifically, the data acquisition device includes a pressure sensor 32, an acceleration sensor 36, the eddy current sensor 39, the temperature sensor 61, the rotation speed sensor 62 and a data collector 63. The pressure sensor 32, the acceleration sensor 36, the temperature sensor 61, the eddy current sensor 39 and the rotation speed sensor 62 are mounted onto the axial loading device, respectively. The temperature sensor 61 is located near the electric spindle 22 and the pressurizing piece 33, respectively. The data collector 63 is located at a side of the rack to collect data from each sensor.

Specifically, the hydraulic and pneumatic auxiliary device includes a main driving motor 45, a heat dissipation electromagnetic reversing valve 46, a lubricating electromagnetic reversing valve 47, a lubricating pressure reducing valve 48, a cooling and pressure reducing valve 65, an oil pipe 49, a heat dissipation motor 50, a heat dissipation fan 51, an air pump 52, a water-gas filter 53, a gas path electromagnetic reversing valve 54, a gas delivery pipe 55, an oil return electromagnetic valve 56, a filter 57, a check valve 58, a relief valve 59 and an oil tank 60. The main driving motor 45, the heat dissipation electromagnetic reversing valve 46, the lubricating electromagnetic reversing valve 47, the heat dissipation motor 50, the heat dissipation fan 51, the gas path electromagnetic reversing valve 54, the oil return electromagnetic valve 56 and the relief valve 59 are located above the oil tank 60. An oil outlet of the main driving motor 45 is connected with an oil inlet P of the heat dissipation electromagnetic reversing valve 46 and an oil inlet P of the lubricating electromagnetic reversing valve 47, respectively. The heat dissipation electromagnetic reversing valve 46 and the lubricating electromagnetic reversing valve 47 are connected to the cooling and pressure reducing valve 65 and the lubricating pressure reducing valve 48, respectively. A cooling joint of the electric spindle 22 is with an outlet of the cooling and pressure reducing valve 65 by the oil pipe 49. The lubricating inlet nozzle tip 38 is connected with the lubricating pressure reducing valve 48 by the oil pipe 49. A relief valve 59 is provided between the main driving motor 45 and the oil inlets P of the heat dissipation electromagnetic reversing valve 46 and the lubricating electromagnetic reversing valve 47. The heat dissipation fan 51 is connected with the heat dissipation motor 50. A gas delivery port of the air pump 52 is connected with an gas inlet of the water-gas filter 53. A gas outlet of the water-gas filter 53 is divided into two paths, with one path being connected with the gas path electromagnetic reversing valve 54, while the other path being connected with the oil return electromagnetic valve 56. The gas path electromagnetic reversing valve 54 is connected with a clamping and loosening joint on the electric spindle 22 by the gas delivery pipe 55. The oil return electromagnetic valve 56 is connected with an oil return port B of the lubricating electromagnetic reversing valve 47. The lubricating outlet nozzle tip 34 in the axial loading device is connected with an oil inlet end of the check valve 58 by the oil pipe 49. An oil outlet of the check valve 58 is connected with an oil inlet end of the filter 57. An oil outlet of the filter 57 is connected with a gas outlet A of the oil return electromagnetic valve 56.

In another practicable embodiment of the present invention, an elliptical portion is provided on the loading driving elliptical shaft 24 in the axial loading device. A long axis of the elliptical portion is 10-30 mm longer than a short axis. An annular oil groove is provided at an edge of a baseplate of the loading pedestal 35 in the axial loading device. The annular oil groove is communicated with the lubricating outlet nozzle tip 34. An arc-shaped groove of the pressurizing piece 33 in the axial loading device is a circular structure.

In another practicable embodiment of the present invention, an inner bore formed when the fixed clamping piece 9 and the mobile clamping piece 11 in the clamping tooling are closed together is an elliptical structure. A circular positioning boss is provided above the fixture pallet 12. A diameter of the circular positioning boss is 1-2 mm larger than an inner diameter of the thin-wall bearing 16.

In another practicable embodiment of the present invention, the rack includes a leg frame 1, a support frame 2, a panel 3, a platform base 4 and a damping block 5. The leg frame 1 is located at a bottom of four support legs of the support frame 2, for adjusting a level of the panel 3. The panel 3 is fixed onto the support frame 2 by a bolt. The damping block 5 is located between the panel 3 and the platform base 4. The platform base 4 is fastened and connected to the panel 3 by a lengthened bolt, and the lengthened bolt has a damping rubber. The electric spindle mounting base 21 is locked onto the T-shaped groove provided at the platform base 4 by a T-shaped bolt.

A working principle of the above embodiments is as follows:

The development of the fault diagnosis and life testing machine for precision flexible thin-wall bearing used for the harmonic reducer should simulate actual working conditions of an elliptical deformation of the flexible thin-wall bearing as much as possible, and then perform life testing. Thus, the fault diagnosis and life testing machine for the flexible precision thin-wall bearing provided by the above-described embodiments includes the axial loading device, the main driving device, the bearing mounting device, the clamping tooling, the data acquisition device, the hydraulic and pneumatic auxiliary device and the rack. According to the actual working conditions of the harmonic reducer, the axial loading device is arranged as a flexible loading mechanism, an arc shape of the pressurizing piece 33 is a circular structure, which may prevent an outer ring from seizure. According to the actual situation of the thin-wall bearing 16 working in the harmonic reducer, the fixed clamping piece 9 in the clamping tooling and the mobile clamping piece 11 are closed together as an ellipse, and the ellipse is also identical in size to an ellipse in a wave generator in the harmonic reducer actually to be detected. At the same time, a precision of the precision flexible thin-wall bearing is generally 3 levels of precision and inner and outer rings are circular, in order to design the clamping tooling with ensuring the installation accuracy. The elliptical journal 64 is provided above the bearing mounting body 14 in the bearing mounting device, and the elliptical journal 64 is also identical in size to the elliptical inner bore in the wave generator in the harmonic reducer actually to be detected.

An operation flow of the above-described embodiments is as follows:

First, clamping the thin-wall bearing 16 onto the bearing mounting body 14:
1) swinging the fixture handle 7, opening the clamping tooling, placing the circular thin-wall bearing 16 between the fixed clamping piece 9 and the mobile clamping piece 11, then swinging the fixture handle 7 to have the fixed clamping piece 9 and the mobile clamping piece 11 to be closed together, extruding the circular thin-wall bearing 16 into an elliptical shape, and providing the guide rod 13 inside the fixture pallet 12 in order to ensure an accuracy of being closed together;
2) gently tapping the bearing mounting body 14 with an aluminum block and placing the bearing mounting body 14 into the elliptical thin-wall bearing 16, providing the boss above the fixture pallet 12 in order to ensure a mounting accuracy of the bearing mounting body 14 and the thin-wall bearing 16, thereby ensuring an axial positioning accuracy of the bearing mounting body 14 and the thin-wall bearing 16; and
3) loosening the clamping tooling, and taking out the bearing mounting body 14.

Second, mounting the bearing mounting device:
1) after completing the first step, taking out the bearing mounting body 14 and installing the boss clamping plate 17 and the semicircular clamping plate 20, fixing them with the clamp bolt 18, placing an elastic washer under a nut and installing the release preventing ring 19 on the nut in order to prevent the nut from falling off during testing, then installing the blind rivet 15 onto the bearing mounting body 14.

Third, testing the thin-wall bearing 16:
1) after the second step of installation, starting the hydraulic and pneumatic auxiliary device and an electrical control device, opening the gas path electromagnetic reversing valve 54, starting a releasing function of the electric spindle 22 to put the bearing mounting body 14 into the electric spindle 22, followed by switching the gas path electromagnetic reversing valve 54 and locking the bearing mounting body 14;
2) then pushing the main driving device to an appropriate position so that the pressurizing piece 33 in the axial loading device clamping the thin-wall bearing 16 with a certain clamping force, may adjusting the loading screw 28 or starting the loading driving device 23 according to an actual testing content to complete loading the dynamic and static loads to the thin-wall bearing 16; and
3) after adjusting the required load, starting the heat dissipation electromagnetic reversing valve 46, the lubricating electromagnetic reversing valve 47 and the heat dissipation motor 50 in the hydraulic and pneumatic auxiliary device, starting the heat dissipation electromagnetic reversing valve 46 first and then starting the lubricating electromagnetic reversing valve 47, after switching on a corresponding auxiliary function, starting the electric spindle 22, so that the electric spindle 22 rotates at a certain rotation speed.

Fourth, conducting data acquisition:
1) after normally starting the present invention, starting the data acquisition, completing the measurement of the rotation speed and temperature of the electric spindle 22, the acquisition of the temperature and vibration quantity of the thin-wall bearing 16, and the measurement of the rotation progress of the bearing mounting body 14

Figure 10:
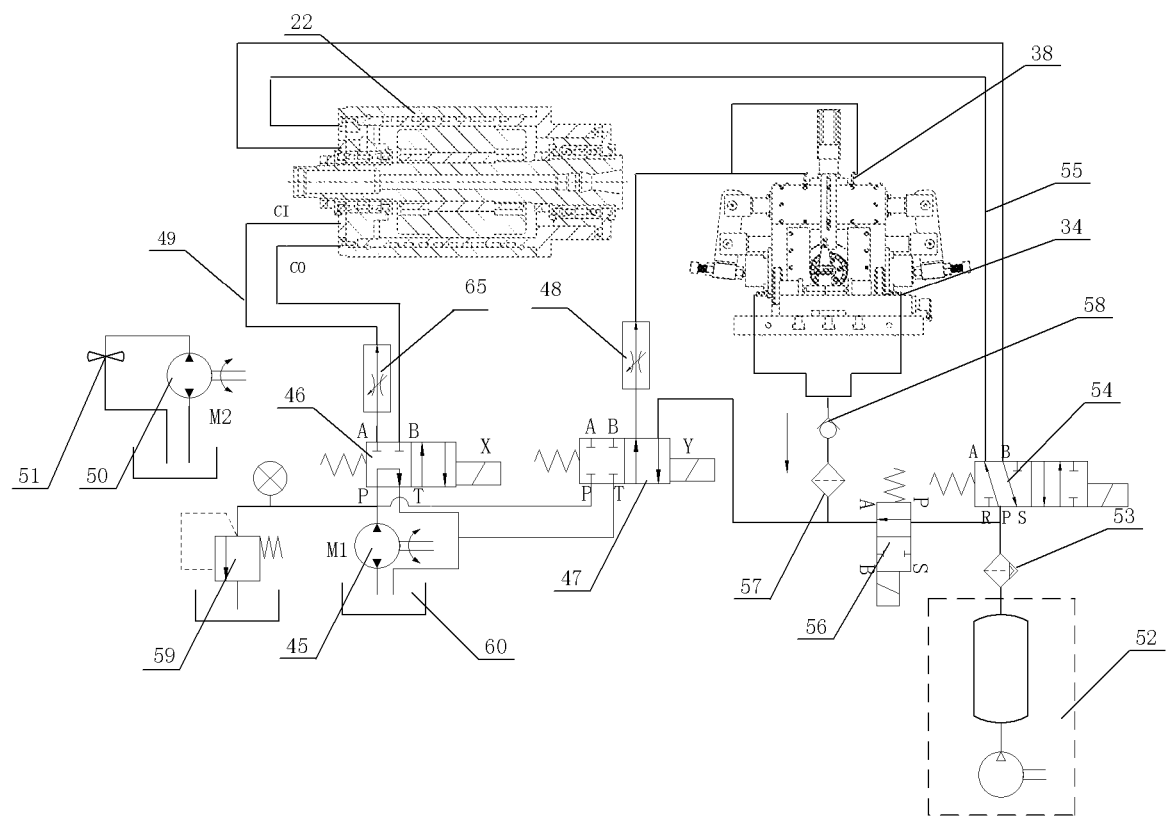
FIG. 10 is a connection schematic view of a hydraulic and pneumatic auxiliary device according to the embodiment of the present invention.
Figure 11:
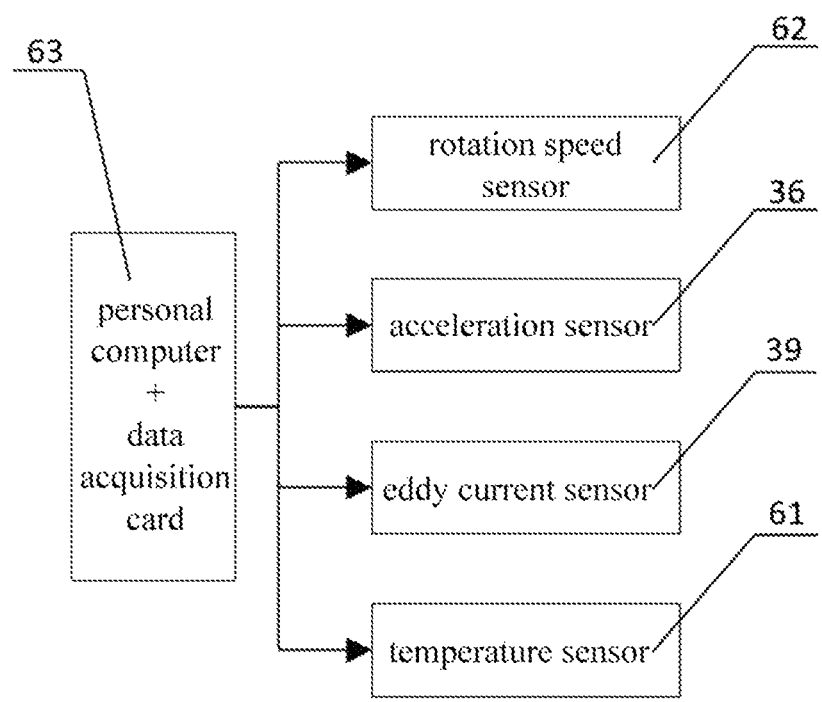
FIG. 11 is a connection schematic view of a data acquisition device according to the embodiment of the present invention.

In particular, in the design of the embodiments of the present invention, the electric spindle 22 requires a set of cooling system and a set of pneumatic clamping and releasing air source. The axial loading device also requires a set of lubrication system on the premise that the electric spindle 22 is working. Thus in the embodiments of the present invention, a set of oil-gas figure of the hydraulic and pneumatic auxiliary device as shown in FIG. 10 is designed. The oil return path of the axial loading device is not easy to achieve an automatic oil return, and thus the oil return electromagnetic valve 56, the filter 57 and the check valve 58 are added according to the siphon phenomenon to complete a lubrication of the oil return.

The embodiments are only preferred examples of the present invention, and are not intended to limit the implementations of the present invention. For those having ordinary skill in the art, different forms of variations or alterations may be made on the basis of the description, and it is not required to or cannot exhaust all the implementations. Any modifications, equivalents improvements and etc. made within the spirit and principles of the present invention shall be included within the scope of protection claimed in the present invention.

What is claimed is:

1. A fault diagnosis and life testing machine for a flexible precision thin-wall bearing, comprising a rack, and an axial loading device, a main driving device, a bearing mounting device, a clamping tooling, a data acquisition device and a hydraulic and pneumatic auxiliary device which are provided on the rack, characterized in that: the main driving device is connected to a rear side of the axial loading device, the clamping tooling is arranged at a front side of the axial loading device, for clamping the thin-wall bearing onto the bearing mounting device; the main driving device comprises an electric spindle mounting base and an electric spindle, the electric spindle mounting base is locked onto the rack by a T-shaped bolt, the electric spindle is fixed onto the electric spindle mounting base by a bolt; the bearing mounting device comprises a bearing mounting body, a blind rivet, a thin-wall bearing, a boss clamping plate, a clamp bolt, a release preventing ring and two symmetrical semicircular clamping plates, the blind rivet is screwed to a tail portion of the bearing mounting body by a screw thread, a conical surface on the bearing mounting body and a conical surface on the electric spindle in the main driving device match with each other and are locked by the blind rivet, the conical surface having a taper ratio of 7:24; the thin-wall bearing is arranged on an elliptical journal of the bearing mounting body, a difference between a long axis and a short axis of the elliptical journal is 1-1.3 times a tooth height of a flexible wheel; the boss clamping plate is arranged at an outer side of the thin-wall bearing, and the semicircular clamping plate is arranged at an inner side of the thin-wall bearing, the boss clamping plate and the semicircular clamping plate clamp the thin-wall bearing arranged therebetween by the clamp bolt, the release preventing ring is arranged on the clamp bolt, the clamp bolt is provided with a via for mounting the release preventing ring; and the data acquisition device is arranged in the axial loading device and at a side of the rack, the hydraulic and pneumatic auxiliary device is arranged at a side of the rack, and is connected to the axial loading device and the main driving device by pipelines, wherein the clamping tooling comprises a fixture base, a fixture handle, a fixed jaw, a mobile jaw, a fixed clamping piece, a mobile clamping piece, a fixture pallet and a guide rod, the fixture base is locked onto a T-shaped groove provided at a platform base by a T-shaped bolt, the fixture handle, the mobile jaw and the fixed jaw are arranged on the fixture base, the mobile jaw is connected to a sliding piece on a screw connected to the fixture handle, the fixed clamping piece and the mobile clamping piece are arranged between the fixed jaw and the mobile jaw, the fixed clamping piece and the fixed jaw are fastened together by a bolt, the mobile clamping piece and the mobile jaw are fastened together by a bolt, the fixture pallet is located under the fixed clamping piece and the mobile clamping piece, the fixture pallet is divided into two pieces, one of the two pieces is fastened with the fixed clamping piece by a screw, while the other one of the two pieces is fastened with the mobile clamping piece by a screw, the guide rod is arranged between the fixed clamping piece and the mobile clamping piece, for guiding the fixed clamping piece and the mobile clamping piece to be closed together.

2. The fault diagnosis and life testing machine for the flexible precision thin-wall bearing according to claim 1, wherein the axial loading device comprises a loading driving device, a loading driving elliptical shaft, a loading bearing, a loading shaft, a loading connecting rod, a loading screw, a loading support, a loading spring, a pressure sensing mounting base, a pressurizing piece, a lubricating outlet nozzle tip, a loading pedestal, an eddy current mounting rack, a lubricating inlet nozzle tip, a loading motor mounting base, a loading shaft mounting piece, loading piece mounting base, a lower oil groove sealing plate and an upper oil groove sealing plate, the loading pedestal is fixed onto the platform base by a T-shaped bolt, left and right halves of the loading shaft mounting piece are symmetrically located above the loading pedestal, the loading motor mounting base is located above the loading shaft mounting piece, passes through the loading shaft mounting piece and is locked and fixed onto the loading pedestal by a bolt, the upper oil groove sealing plate is arranged at front and rear sides of the loading shaft mounting piece and is fastened by a screw, the loading driving device is located above the loading motor mounting base, the loading driving elliptical shaft is fixed between the loading pedestal and the loading motor mounting base by rolling bearings provided at both ends of the loading driving elliptical shaft, the loading bearing is fixed at an end of the loading shaft, the loading shaft is located on the loading shaft mounting piece, the loading connecting rod is connected with the loading shaft by a U-shaped opening provided on the loading connecting rod, an end of the loading support is fixed on the loading pedestal, the other end of the loading support is connected with the loading connecting rod by a pin, the loading screw is located at an end of the loading connecting rod, the loading spring is located between the pressure sensing mounting base and the loading screw, the pressure sensing mounting base is located at an end of the loading spring, the pressurizing piece is located on the loading pedestal and is located inside a guide groove of the loading piece mounting base, the lower oil groove sealing plate is fixed at front and rear sides of the loading pedestal, the loading piece mounting base is fixed inside the loading pedestal by a bolt, the lubricating inlet nozzle tip is located above the loading motor mounting base, the lubricating outlet nozzle tip is located at a middle position under the loading pedestal, the eddy current mounting rack is fixed onto the upper oil groove sealing plate, for mounting an eddy current sensor, a temperature sensor and a rotation speed sensor.

3. The fault diagnosis and life testing machine for the flexible precision thin-wall bearing according to claim 2, wherein the data acquisition device comprises a pressure sensor, an acceleration sensor, the eddy current sensor, the temperature sensor, the rotation speed sensor and a data collector, the pressure sensor, the acceleration sensor, the temperature sensor, the eddy current sensor and the rotation speed sensor are mounted onto the axial loading device respectively, the temperature sensor is located near the electric spindle and the pressurizing piece respectively, the data collector is located at a side of the rack to collect data from each sensor.

4. The fault diagnosis and life testing machine for the flexible precision thin-wall bearing according to claim 3, wherein the hydraulic and pneumatic auxiliary device comprises a main driving motor, a heat dissipation electromagnetic reversing valve, a lubricating electromagnetic reversing valve, a lubricating pressure reducing valve, a cooling and pressure reducing valve, an oil pipe, a heat dissipation motor, a heat dissipation fan, an air pump, a water-gas filter, a gas path electromagnetic reversing valve, an gas delivery pipe, an oil return electromagnetic valve, a filter, a check valve, a relief valve and an oil tank, the main driving motor, the heat dissipation electromagnetic reversing valve, the lubricating electromagnetic reversing valve, the heat dissipation motor, the heat dissipation fan, the gas path electromagnetic reversing valve, the oil return electromagnetic valve and the relief valve are located above the oil tank, an oil outlet of the main driving motor is connected with an oil inlet of the heat dissipation electromagnetic reversing valve and an oil inlet of the lubricating electromagnetic reversing valve respectively, the heat dissipation electromagnetic reversing valve and the lubricating electromagnetic reversing valve are connected to the cooling and pressure reducing valve and the lubricating pressure reducing valve respectively, a cooling joint of the electric spindle is connected with an outlet of the cooling and pressure reducing valve by the oil pipe, the lubricating inlet nozzle tip is connected with the lubricating pressure reducing valve by the oil pipe, a relief valve is provided between the main driving motor and the oil inlets of the heat dissipation electromagnetic reversing valve and the lubricating electromagnetic reversing valve, the heat dissipation fan is connected with the heat dissipation motor, a gas delivery port of the air pump is connected with an gas inlet of the water-gas filter, a gas outlet of the water-gas filter is divided into two paths, one of the two paths is connected with the gas path electromagnetic reversing valve, while the other one of the two paths is connected with the oil return electromagnetic valve, the gas path electromagnetic reversing valve is connected with a clamping and loosening joint on the electric spindle by the gas delivery pipe, the oil return electromagnetic valve is connected with an oil return port of the lubricating electromagnetic reversing valve, the lubricating outlet nozzle tip in the axial loading device is connected with an oil inlet end of the check valve by the oil pipe, an oil outlet of the check valve is connected with an oil inlet end of the filter, an oil outlet of the filter is connected with a gas outlet of the oil return electromagnetic valve.

5. The fault diagnosis and life testing machine for the flexible precision thin-wall bearing according to claim 2, wherein an elliptical portion is provided on the loading driving elliptical shaft in the axial loading device, a long axis of the elliptical portion is 10-30 mm longer than a short axis; an annular oil groove is provided at an edge of a baseplate of the loading pedestal in the axial loading device, the annular oil groove is communicated with the lubricating outlet nozzle tip; and an arc-shaped groove of the pressurizing piece in the axial loading device is a circular structure.

6. The fault diagnosis and life testing machine for the flexible precision thin-wall bearing according to claim 1, wherein an inner bore formed when the fixed clamping piece and the mobile clamping piece in the clamping tooling are closed together is an elliptical structure, a circular positioning boss is provided above the fixture pallet, a diameter of the circular positioning boss is 1-2 mm larger than an inner diameter of the thin-wall bearing.

7. The fault diagnosis and life testing machine for the flexible precision thin-wall bearing according to claim 1, wherein the rack comprises a leg frame, a support frame, a panel, a platform base and a damping block, the leg frame is located at bottoms of four support legs of the support frame, for adjusting a level of the panel, the panel is fixed onto the support frame by a bolt, the damping block is located between the panel and the platform base, the platform base is fastened and connected to the panel by a lengthened bolt, and the lengthened bolt has a damping rubber.

\* \* \* \* \*